United States Patent [19]

Uchimura et al.

[11] Patent Number: 4,484,951

[45] Date of Patent: Nov. 27, 1984

[54] ALUMINUM FLAKE PIGMENT COMPOSITION FOR PAINT

[75] Inventors: Eikichi Uchimura, Yamatokoriyama; Yoshiki Hashizume, Kashiwara, both of Japan

[73] Assignee: Toyo Aluminum Kabushiki Kaisha, Minami-Kyutaromachi, Japan

[21] Appl. No.: 529,678

[22] Filed: Sep. 6, 1983

Related U.S. Application Data

[63] Continuation-in-part of Ser. No. 297,617, Aug. 31, 1981, abandoned, which is a continuation-in-part of Ser. No. 110,229, Jan. 7, 1980, abandoned.

[30] Foreign Application Priority Data

Jan. 23, 1979 [JP] Japan .................................. 54-6758
Jan. 23, 1979 [JP] Japan .................................. 54-6759

[51] Int. Cl.³ .......................... C09C 1/64; C09C 3/04
[52] U.S. Cl. .................................. 106/290; 106/14.13; 106/14.15; 106/14.23; 106/14.24; 106/14.27; 106/291; 106/308 Q; 106/308 F; 106/308 N; 106/308 S; 106/309; 241/16
[58] Field of Search ................. 106/290, 291, 308 F, 106/308 N, 308 S, 308 Q, 309, 14.13, 14.15, 14.17, 14.21, 14.23, 14.24, 14.27; 241/16, 21

[56] References Cited

U.S. PATENT DOCUMENTS

| | | | |
|---|---|---|---|
| 2,002,891 | 6/1931 | Hall ........................................ | 134/76 |
| 2,522,538 | 9/1950 | Rethwisch et al. ................. | 106/290 |
| 3,067,053 | 12/1962 | Tarantino ......................... | 106/308 S |
| 3,075,849 | 1/1963 | Dreher et al. .................... | 106/308 N |
| 3,244,542 | 4/1966 | Brown et al. ....................... | 106/277 |
| 3,383,328 | 5/1968 | Baker et al. ...................... | 106/14.13 |
| 3,551,174 | 12/1970 | Hauska et al. ................... | 106/290 X |
| 3,918,984 | 11/1975 | High et al. .......................... | 106/290 |
| 4,028,117 | 6/1979 | Moat et al. ........................ | 106/14.27 |
| 4,138,270 | 2/1979 | Ishijima et al. ..................... | 106/291 |
| 4,153,464 | 5/1979 | Sturwold et al. ................. | 106/14.27 |
| 4,220,473 | 9/1980 | Robertson ....................... | 106/308 F |
| 4,221,593 | 9/1980 | Kubo .................................. | 106/290 |
| 4,350,534 | 9/1982 | Ishijima et al. ................. | 106/290 X |

FOREIGN PATENT DOCUMENTS

| | | | |
|---|---|---|---|
| 322692 | 6/1975 | Austria . | |
| 641298 | 5/1962 | Canada .................................. | 241/16 |
| 1220953 | 7/1966 | Fed. Rep. of Germany . | |
| 3002175 | 7/1980 | Fed. Rep. of Germany . | |
| 665709 | 1/1952 | United Kingdom . | |
| 1110857 | 4/1968 | United Kingdom . | |
| 1191204 | 5/1970 | United Kingdom . | |
| 2006246 | 5/1979 | United Kingdom ............ | 106/308 S |

OTHER PUBLICATIONS

Rö mps Chemie-Lexikon, 7, Auflage, 1973, Band 2, Seite 853.

*Primary Examiner*—Helen M. McCarthy
*Attorney, Agent, or Firm*—Wegner & Bretschneider

[57] ABSTRACT

An aluminum flake pigment composition for paint, containing 100 parts by weight of aluminum flake particles, 1 to 7 parts by weight of dimer acid, 0.5 to 14 parts by weight of aliphatic amine and other additives known in this art. The incorporation of the dimer acid enhances the color purity, metallic luster and anticorrosion property of a metallic paint containing the same composition and the incorporation of the aliphatic amine prevents the agglomeration of the aluminum flake pigment particles in the same composition.

7 Claims, No Drawings

ALUMINUM FLAKE PIGMENT COMPOSITION FOR PAINT

This is a continuation-in-part of application Ser. No. 297,617 filed Aug. 31, 1981 which is a continuation-in-part of application Ser. No. 110,229 filed Jan. 7, 1980, both now abandoned.

This invention relates to a novel aluminum flake pigment composition for metallic paint much improved in colour purity, metallic luster and anticorrosion property and a method of producing the same. This invention further relates to a novel aluminum flake pigment composition for aqueous medium use, which has much improved corrosion resistance in aqueous medium and gives much improved metallic luster and colour purity to a paint film, as well as to a method of producng the same.

While aluminum flake pigments manufactured by finely grinding aluminum powder have been used in various coating purposes, such conventional products were poor in the colour purity, i.e., exhibiting dark turbid colour in coated film and not quite satisfactory for high colour purity. In addition, these conventional aluminum pigments had an insufficient anticorrosion property. Especially, when the aluminum pigments are used in an aqueous paint composition, corrosion is proceeded, for example, by the gradual reaction between aluminum particles and water in the aqueous medium to produce hydrogen gas, and remarkable reduction in the metallic luster is inevitably resulted even by the addition of various anticorrosion agents. These defects of aluminum pigments are found particularly after the long storage in the form of aluminum flake pigment composition or aluminum paint composition. Moreover, not a little amount of ultramicronized aluminum and iron particles is inevitably produced by the grinding under the conventional grinding agent of, for instance, aliphatic organic acid. As these ultramicronized particles are black colloidal particles having no metallic luster, the high colour purity and high reflectivity (L value) of metallic paint film are not expected.

In order to eliminate the foregoing defects in the prior art, the inventors have made an earnest study and, as the result, found that addition and admixture of a dimer acid which is a dimer of an unsaturated higher aliphatic acid having 12 or more carbon atoms (monoene acid, diene acid and/or triene acid) and aliphatic amine in a predetermined amount, respectively, is very effective for the improvement in the colour purity, metallic luster and anticorrosion property of aluminum flake pigment without any agglomeration of the flake particles.

Addition and admixture of the dimer acid and the aliphatic amine to the aluminum flake pigment composition in this invention can be conducted in optional manner such as addition and admixture in conventional products or semi-products but it is advantageous in view of industrial production to add and admix the dimer acid in any step of so-called wet process known as methods of preparing aluminum flake pigments. Accordingly, this invention is to be described in details referring to typical preparation examples advantageous for the industrial production of the composition according to this invention.

Most common working steps of the wet process for the production of the aluminum flake pigment can be summarized as follows:

Starting aluminum powder such as atomized aluminum powder and shredded aluminum foil is ground at the presence of a grinding agent, a grinding medium such as an aliphatic or aromatic hydrocarbon solvent and, if necessary, other various additives in a grinding apparatus, and then the aluminum flake powder mixture is collected with using the same liquid medium as the grinding medium from the grinding apparatus, classified or fractionated by sieving in a wet state, and subjected to solid-liquid separation in a filter press or the like to prepare a filter cake of about 70 to 80% solid content. In the following mixing step, a liquid medium is added and mixed, if desired, together with a surface active agent to the filter cake to prepare a paste-like aluminum flake pigment products having a desired solid content (about 65%). In this mixing step, various additives such as anticorrosion agent, surface active agent, leveling agent and viscosity improver may also be added and mixed depending on the purposes, or aluminum pigments of different grade are added and mixed for the tone control.

The composition according to this invention can be produced with advantages by adding the dimer acid in any one of the steps in the wet process summarized as above. Specifically, according to this invention, since the dimer acid also has a sufficient function as a grinding agent, it can be used as the grinding agent alone or used in combination with conventional agents such as various monobasic long-chained fatty acids. When the atomized aluminum powder or shredded foil of aluminum is ground with the dimer acid, the very small amount of ultramicronized particles of aluminum less than 5 μm in diameter is produced. Therefore, the high colour purity and high L value as well as the sharp distribution of the particle size of the aluminum pigment are obtained. The superior colour purity and L value by the aluminum pigment of this invention are favorable in the metallic paint film due to the similar content of ultramicronized aluminum particles and the sharp distribution of the particle size, which novel improvements result from the use of dimer acid as a grinding agent.

Alternatively, the dimer acid may also be added and mixed after the grinding of the starting atomized aluminum powder with the conventional grinding agent, or the dimer acid can be added portionwise in a predetermined amount to both of the grinding step and the mixing step. When the dimer acid is added and mixed after the grinding of the starting aluminum powder, the dimer acid reacts with the ultramicronized particles to produce a transparent product, thereby the hiding power of the paint film may be reduced as indicated in Examples described later in addition to the enhancement of the colour purity and L value of the paint film.

While the dimer acid employed in this invention is a dimer of an unsaturated long chained fatty acid having 12 or more carbon atoms (monoene acid, diene acid and/or triene acid), preferably, having 12 to 22 carbon atoms, it can be also used as a mixture of a trimer acid (trimer) and monomer acid in addition to the dimer acid as the essential ingredient. Typical examples of them include a dimer acid derived from oleic acid with 18 carbon atoms and a dimer acid derived from linoleic acid and trimer acid and they are commercially available as a mixture of aliphatic acids containing 70 to 98% of dimer acid (Versadime: Japan General Mills Company, Empole: Emery company and the like). The amount of the dimer acid is 1 to 7 parts by weight to 100 parts by weight of aluminum flake particles. Improvements in the colour purity, metallic luster and anticorrosion property are insufficient below the lower limit and, on the other hand, the film strength of the paint film is impaired above the upper limit.

According to this invention, each aluminum flake pigment particle is coated with the dimer acid and the coating of dimer acid enhances the colour purity, metallic luster and anticorrosion of the aluminum flake pigment, as indicated in Examples described later. For example, the amount of gas evolved is less than 10 ml in a state of normal temperature and pressure under the violent test of gas evolution in wich the aluminum flake pigment composition added with the dimer acid is dispersed by 3 g (as the metal component) in 100 ml of water/butylcellosolve (=1:4) medium and the dispersion is kept at 50° C. for 100 hours at pH of 5 to 7, which indicates the superior anticorrosion property of the composition according to this invention. Moreover, the difference of L value between before and after the gas evolution test is less than 1.

There is a problem that with increasing the addition amount of dimer acid into the aluminum flake pigment composition, the flake pigment particles tend to agglomerate with each other, which lowers the value of the composition and therefore should be prevented. The agglomeration once occurred in the presence of dimer acid, however, can't be finely divided and is not redispersable. Accordingly, it is desirable to solve this problem as well. It was found that the problem can be overcome much effectively by the inclusion of a long-chained aliphatic amine with 8 or more carbon atoms by a predetermined amount. In this case, the effective addition amount of the amine is in the range of 0.5 to 14 parts by weight to 100 parts by weight of aluminum flake particles.

Preferred amine in this invention is primary or secondary and includes, for instance, caprylamine, decylamine, laurylamine, myristylamine, palmitylamine, stearylamine, oleylamine, distearylamine and dilaurylamine. The primary amine may be employed in the amount of 0.5 to 7 parts by weight and the secondary amine may be employed in the amount of 1 to 14 parts by weight to 100 parts by weight of aluminum flake pigment. These amines may be added alone or in the form of the mutual mixture thereof into the composition of this invention.

Since these amines also function as the grinding agent, the amines may be added in optional manners in this invention as in the addition of the foregoing dimer acid. Specifically, the amines can be added in any of the steps for the above wet process, or they may be added and mixed additionally to the products after completion of all of the above steps.

Generally, when too much of dimer acid or aliphatic amine is added to the aluminum flake pigment composition, the film strength of the paint film becomes weak. However, under their amount defined herein, no trouble in the film strength occurs and the film strength equal to the conventional one may be obtained.

The aluminum flake pigment according to the invention is usually of less than 44 micron in size, passed through 325 mesh screen and may partially include particles of more than 44 micron, if necessary. The purity of aluminum pigment is preferably 99.0 to 99.99%.

The surface active agents used for the preparation of pigment for the aqueous paint have no particular restriction so long as they can render the present composition water dispersable and they can be properly selected from various known surface active agents. The effective addition amount of them is usually within the range of 3 to 17 parts by weight to 100 parts by weight of aluminum flake pigment. Preferred surface active agents in this invention are exemplified and summarized as below. Anionic surface active agent: fatty acid soaps, long-chained alcohol sulfate, polyoxyethylene alkylether sulfate, polyoxyethylene alkylphenylether sulfate, polyoxyethylene isooctylphenylether sulfonate, sodium alkylbenzene sulfonate, polyoxyethylene alkylphenolether phosphate, polyoxyethylene alkylether phosphate; nonionic surface active agent: Polyoxyethylene alkylether, polyoxyethylene alkylphenolether, polyoxyethylene alkylamide, polyoxyethylene fatty acid ester, polyoxyethylene sorbitan fatty acid ester and sorbitan fatty acid ester.

While the composition according to this invention can be incorporated, with no troubles, with any additives that are known in this art and contained in conventional metallic flake pigment composition of water dispersion type or organic solvent type, such as grinding agents, grinding medium, liquid medium, surface active agents and various other additives. These known additives may be exemplified and summarized as follows:

1. Grinding Medium or Liquid Medium

Aliphatic hydrocarbon solvents such as mineral spirit, aromatic hydrocarbon solvents such as solvent naphtha and other conventional grinding medium excepting water.

2. Grinding Agent

Saturated or unsaturated long-chained monobasic fatty acids with 8 or more carbon atoms, esters, amides and alcohols thereof. They specifically include, for example, oleic acid, stearic acid, behenic acid, palmitic acid, myristic acid, lauric acid, linoleic acid, isostearic acid, butyl stearate, methyl oleate, oleamide, stearyl alcohol and oleyl alcohol.

3. Other Additives

Anitcorrosion agents such as benzotriazole and various amines; leveling agent such as silicone and fluorine-surface active agent; viscosity improvers such montmorillonite.

Although the composition according to this invention prepared as above with addition of the amines is useful without surface active agents as pigment for use in organic solvent type (oily) paint, it can, of course, be used also as aqueous coating pigment by rendering it water dispersible with the addition of appropriate surface active agent.

The significant effects of this invention can be understood clearly by the following descriptions for non-limiting examples and comparison test examples.

EXAMPLE 1A

| | |
|---|---|
| Atomized aluminum powder (AA101, manufactured by Toyo aluminum K.K.) | 1.1 kg |
| Mineral spirit | 1.25 l |
| Dimer acid (Empole 1022, manufactured by Emery Co.) | 50 g | were charged in a 50 cm diameter ball mill and ground for 2 hours and 30 minutes. After the end of the grinding, the slurry was washed out with 8 l of mineral spirit containing 4 g/100 ml of a dimer acid and passed through a 325 mesh screen. Thereafter, they were subjected filtration in a pan filter to obtain a filter cake containing 70% by weight of aluminum component. Stearylamine and mineral spirit were added to the filter cake so as to contain 65% of aluminum and mixed in a kneader for 30 minutes to obtain aluminum paste.

The aluminum paste had 9,400 cm$^2$/g hiding power and contained about 2.5 parts by weight of the dimer acid and 2.0 parts by weight of stearylamine per 100 parts by weight of the aluminum component.

COMPARISON EXAMPLE 1A

| Atomized aluminum powder (AA101, manufactured by Toyo aluminum K.K.) | 1.1 kg |
|---|---|
| Mineral spirit | 1.25 l |
| Oleic acid | 50 g | were charged in a 50 cm diameter ball mill and ground for 2 hours. After the end of the grinding, the slurry was washed out with 8 l of mineral spirit containing 4 g/100 ml oleic acid and passed through a 325 mesh screen. After filtration, an aluminum filter cake containing 80% of aluminum component was obtained. Thereafter, aluminum paste was prepared from the aluminum filter cake in the same manner as in Example 1A. The resulted aluminum paste had 9,300 cm$^2$/g hiding power and contained about 2.2 parts by weight of oleic acid and 2.0 parts by weight of stearylamine per 100 parts by weight of the aluminum component.

EXAMPLE 2A

The aluminum filter cake obtained in Comparison Example 1A was mixed in the following composition for one hour to obtain the aluminum paste. The added amount of the mineral spirit was adjusted to dilute the concentration of the aluminum component in the aluminum paste to 65% by weight.

| Aluminum pigment filter cake | 1,250 g |
|---|---|
| Dimer acid (Versadime 216, manufactured by Nippon General Mills Co.) | 50 g |
| Stearylamine (Farmine 80, manufactured by Kao Sekken Co.) | 40 g |
| Mineral spirit | rest |

COMPARISON EXAMPLE 2A

The aluminum filter cake obtained in Comparison Example 1A was mixed in the following composition for one hour to obtain the aluminum paste. The added amount of the mineral spirit was adjusted to dilute the concentration of the aluminum component in the aluminum paste to 65% by weight.

| Aluminum pigment filter cake | 1,250 g |
|---|---|
| Dimer acid (Versadime 216, manufactured by Nippon General Mills Co.) | 100 g |
| Stearylamine (Farmine 80, manufactured by Kao Sekken Co.) | 80 g |
| Mineral spirit | rest |

EXAMPLE 3A

The aluminum filter cake obtained in Comparison Example 1A was mixed in the following composition for one hour to obtain the aluminum paste. The added amount of the mineral spirit was adjusted to dilute the concentration of the aluminum component in the aluminum paste to 65% by weight.

| Aluminum pigment filter cake | 1,250 g |
|---|---|
| Dimer acid (Empole 1014, manufactured by Emery Co.) | 30 g |
| Dilaurylamine (Armic 2c, manufactured by Lion Yushi Co.) | 40 g |
| Mineral spirit | rest |

COMPARISON EXAMPLE 3A

The aluminum filter cake obtained in Comparison Example 1A was mixed in the following composition for one hour to obtain the aluminum paste. The added amount of the mineral spirit was adjusted to dilute the concentration of the aluminum component in the aluminum paste to 65% by weight.

| Aluminum pigment filter cake | 1,250 g |
|---|---|
| Dimer acid (Versadime 216, manufactured by Nippon General Mills Co.) | 70 g |
| Mineral Spirit | rest |

Each of the following tests was conducted for each of the samples obtained in the above examples and comparison examples. Results are summarized in Table 1.

TEST 1A

Measurement of Hiding Power (cm$^2$/g)

A paint was prepared by adding leafing aluminum pigment, the water covering area (cm$^2$/g) of which was known, into a vehicle of nitrocellulose lacquer (Pilac, manufactured by Nippon Paint Co.) in an amount of 0.2% by weight. The paint thus obtained was coated and dried on both surface of a standard black and white test paper for measuring hiding power to obtain a coated film of 100 micron in thickness. The reflectivity of the coated film, L value (0°-d method), was measured by differential colorimeter and then the correleation diagram between the water covering area and the value of $(L_{black}/L_{white}) \times 100$ (%) was drawn by plotting the value of $(L_{black}/L_{white}) \times 100$ (%) against the water covering area.

A value of $(L_{black}/L_{white}) \times 100$ (%) of an aluminum pigment to be tested was measured in the same manner as above and from the measured value the water covering area of the aluminum pigment to be tested was estimated while referring to the correlation diagram abovementioned.

The hiding power of the aluminum pigment to be tested was corresponding to the water covering area thus estimated.

TEST 2A

Colour Purity

Aluminum paint in the following composition was prepared and coated by a doctor blade. The colour purity of the coated film was estimated visually:

| Nitrocellulose lacquer (Pilac, manufactured by Nippon Paint Co.) | 47 g |
|---|---|
| Blue enamel (Unicolour, manufactured by Nippon Paint Co.) | 2 g |
| Aluminum pigment sample (as aluminum component) | 3 g |

TEST 3A

Colour Purity, L-Value, Film Strength, Gas Evolution and ΔL Value

An aqueous metallic paint in the following composition was prepared and coated by a doctor blade. The visual colour purity, film strength and L value of the coated film were observed and estimated. The film strength of the coated film was measured by the method of Erichsen Film Tester, in which the constant pressure on a steel ball (⅜ inch in diameter) was vertically applied on the back of the coated panel and the distance ball had traveled was measured when the coated film was cracked and came off. In case the distance is more than 3 mm, the film strength is good (◯) and in case the distance is less than 3 mm, the film strength is bad (X).

The amount of gas evolved from the paint kept at 50° C. was measured for one month. The paint after the gas evolution test was coated by a doctor blade and the difference of L value (ΔL value) of coated films before and after the test was measured by a differential colorimeter.

| | |
|---|---|
| Water soluble acrylic varnish (Arolon 557N, manufactured by Nishoku Arrow Chemical Co.) | 560 g |
| Water soluble melamine varnish (Sumimal M-50W, manufactured by Sumitomo Kagaku Co.) | 150 g |
| Phthalocyanine blue (NK Blue, manufactured by Dainippon Ink Co.) | 32 g |
| Butylcellosolve | 90 g |
| Aluminum pigment sample (as aluminum component) | 48 g |

TEST 4A

Gas Evolution and ΔL value

Aluminum pigment sample was dispersed by 3 g (as the metal component) in 100 ml of water/butylcellosolve (=1:4) medium and the dispersion was kept at 50° C. The amount of gas evolved from the dispersion was measured for one month. Two kinds of paint were prepared, one of which has the same composition as in Test 3A and the other has the same composition as in Test 3A but includes the aluminum pigment sample after the gas evolution test of the instant Test 4A. After separately coating the two paints, the difference of L value (ΔL value) between the two coated films was measured by the differential colorimeter.

TEST 5A

Agglomeration test

The aluminum pigment samples were charged in tin cans and kept in a thermostable chamber at 50° C. Agglomeration in the samples was measured after one month using 325 mesh screen.

EXAMPLE 1B

| | |
|---|---|
| Atomized aluminum powder (AA101, manufactured by Toyo Aluminum K.K.) | 1.0 kg |
| Mineral spirit | 1.25 l |
| Dimer acid (Empole 1022, manufactured by Emery Co.) | 50 g | were charged in a 50 cm diameter ball mill and ground for 2 hours and 30 minutes. After the end of the grinding, the slurry was washed out with 8 l of mineral spirit containing 4 g/100 ml of the dimer acid and passed through a 325 mesh screen. Thereafter, they were subjected to filtration in a pan filter to obtain filter cake containing 80% by weight of the aluminum content. The filter cake had 9,400 $cm^2/g$ of hiding power and contained about 1.5 parts by weight of the dimer acid per 100 parts by weight of the aluminum component. The filter cake was mixed in the following composition for one hour to prepare water dispersible aluminum paste pigment. The resulted aluminum paste contained 65% by weight of aluminum component.

| | |
|---|---|
| Aluminum pigment filter cake | 1,250 g |
| Polyoxyethylene alkylphenolether (Emalgen 913, manufactured by Kao Sekken Co.) | 60 g |
| Polyoxyethylene alkylether (Emalgen 408, manufactured by Kao Sekken Co.) | 30 g |
| Dilaurylamine (Armine 2C, manufactured by Lion Yushi Co.) | 20 g |
| Mineral Spirit | rest |

COMPARISON EXAMPLE 1B

| | |
|---|---|
| Atomized aluminum powder (AA101, manufactured by Toyo Aluminum K.K.) | 1.0 kg |
| Mineral spirit | 1.25 l |
| Oleic acid | 50 g | were charged in a 50 cm diameter ball mill and ground for 2 hours. After the end of the grinding, the slurry was washed out with 8 l of mineral spirit containing 4 g/100 ml of the oleic acid and passed through a 325 mesh screen. Thereafter, they were subjected to filtration in a pan filter to obtain filter cake containing 80% by weight of the aluminum component. The filter cake had 9,300 $cm^2/g$ hiding power and contained about 1.3 parts by weight of the oleic acid per 100 parts by weight of the aluminum component. The filter cake was compounded in the following composition for one hour to prepare water dispersible aluminum paste pigment. The resulted aluminum paste contained 65% by weight of aluminum component.

| | |
|---|---|
| Aluminum pigment filter cake | 1,250 g |
| Polyoxyethylene alkylphenolether (Emalgen 913, manufactured by Kao Sekken Co.) | 60 g |
| Polyoxyethylene alkylether (Emalgen 408, manufactured by Kao Sekken Co.) | 30 g |
| Dilaurylamine (Armine 2C, manufactured by Lion Yushi Co.) | 20 g |
| Mineral spirit | rest |

EXAMPLE 2B

The filter cake obtained in Comparison Example 1B was compounded in the following composition for one hour. The resulted aluminum paste contained 65% by weight of aluminum component.

| | |
|---|---|
| Aluminum pigment filter cake | 1,250 g |
| Dimer acid (versadime 216, manufactured by Japan General Mills Co.) | 50 g |
| Stearylamine (Farmine 80, manufactured by Kao Sekken Co.) | 40 g |
| Polyoxyethylene sorbitantrioleate | 150 g |

-continued

| | |
|---|---|
| (Solvon T-85, manufactured by Toho Kagaku Co.) | |
| Mineral spirit | rest |

EXAMPLE 3B

The filter cake used in Comparison Example 1B was mixed in the following composition for one hour. The resulted aluminum paste contained 65% by weight of aluminum component.

| | |
|---|---|
| Aluminum pigment filter cake | 1,250 g |
| Dimer acid | 40 g |
| (Empole 1014, manufactured by Emery Co.) | |
| Stearylamine (Farmine 80, manufactured by Kao Sekken Co.) | 60 g |
| Polyoxyethylene alkylphenolether (Triton X-100, manufactured by R & H Co.) | 70 g |
| Mineral spirit | rest |

The following experiments were conducted for each of the samples prepared in the above examples and comparison examples. The results are summarized in Table 2 below.

TEST 1B

Measurement of Hiding Power ($cm^2/g$)

Test 1B was the same as Test 1A.

TEST 2B

Colour Purity, L-Value, Film Strength, Gas Evolution and ΔL Value

An aqueous aluminum paint in the following composition was prepared and coated by a doctor blade. The visual colour purity, film strength and L value of the coated film were observed and estimated. The film strength of the coated film was measured by the method of Erichsen Film Tester, in which the constant pressure on a steel ball (⅜ inch in diameter) was vertically applied on the back of the coated panel and the distance ball had traveled was measured when the coated film was cracked and came off.

In case the distance is more than 3 mm, the film strength is good (◯) and in case the distance is less than 3 mm, the film strength is bad (X).

The amount of gas evolved from the paint was measured by keeping the paint at a temperature of 50° C. for one month. The paint after the gas evolution test was coated by a doctor blade and the difference of L value (ΔL value) of coated films before and after the test was measured by a differential colorimeter.

| | |
|---|---|
| Water soluble acrylic varnish (Arolon 557N, manufactured by Nishoku Arrow Chemicals Co.) | 560 g |
| Water soluble melamine varnish (Sumimal M-50W, manufactured by Sumitomo Chemicals Co.) | 150 g |
| Phthalocyanine Blue (NK Blue, manufactured by Dainippon Ink Co.) | 32 g |
| Distilled water | 90 g |
| Aluminum pigment sample (as aluminum component) | 48 g |

TEST 3B

Gas Evolution and ΔL Value

Aluminum pigment sample was dispersed by 3 g (as the metal component) in 100 ml of water/butylcellosolve (=1:4) medium and the dispersion was kept at 50° C. The amount of gas evolved from the dispersion was measured for one month. Two kinds of paint were prepared, one of which has the same composition as in Test 2B and the other has the same composition as in Test 2B but includes the aluminum pigment sample after the gas evolution test of the instant Test 3B. After separately coating the two paints, the difference of L value (ΔL value) between the two coated films was measured by the differential colorimeter.

TEST 4B

Agglomeration test

The aluminum pigment samples were charged in tin cans and kept in a thermostable chamber at 50° C. Agglomeration in the samples was measured after one month using 325 mesh screen.

TABLE 1

| | | Composition (parts by weight) | | Test 1A Hiding Power | Test 2A Colour Purity | Test 3A | | | | |
|---|---|---|---|---|---|---|---|---|---|---|
| Example | Grinding agent | *A | *B | *C/*D | *E | Colour Purity *E | L-value | Film Strength | Gas Evolution | ΔL value |
| Example 1A | Dimer Acid | Dimer Acid 2.5 | Stearylamine 2.0 | 9400/9400 | ◎ | ◎ | 66 | ◯ | none | 0.2 |
| Comparative Example 1A | Oleic Acid | Oleic Acid 2.2 | Stearylamine 2.0 | 9300/9300 | X | X | 64 | ◯ | Gradually evolved | 3.1 |
| Example 2A | Oleic Acid | Oleic Acid 2.2 | Dimer Acid 5.0 Stearylamine 4.0 | 9300/8200 | ◯ | ◯ | 66 | ◯ | none | 0.2 |
| Comparative Example 2A | Oleic Acid | Oleic Acid 2.2 | Dimer Acid 10.0 Stearylamine 8.0 | 9300/8300 | ◯ | ◯ | 66 | X | none | 0.3 |
| Example 3A | Oleic Acid | Oleic Acid 2.2 | Dimer Acid 3.0 Dilaurylamine 4.0 | 9300/8200 | ◎ | ◎ | 66 | ◯ | none | 0.3 |
| Comparative Example 3A | Oleic Acid | Oleic Acid 2.2 | Dimer Acid 7.0 | 9300/8000 | ◯ | ◯ | 66 | ◯ | none | 0.2 |

Test 4A

TABLE 1-continued

| Example | Grinding agent | Composition (parts by weight) *A | *B | Gas Evolution *F | ΔL value | Test 5A Agglomer- ation |
|---|---|---|---|---|---|---|
| Example 1A | Dimer Acid | Dimer Acid 2.5 | Stearylamine 2.0 | 2.0 | 0.2 | none |
| Comparative Example 1A | Oleic Acid | Oleic Acid 2.2 | Stearylamine 2.0 | >100 | Opaque (unable to measure) | none |
| Example 2A | Oleic Acid | Oleic Acid 2.2 | Dimer Acid 5.0 Stearylamine 4.0 | 1.5 | 0.3 | none |
| Comparative Example 2A | Oleic Acid | Oleic Acid 2.2 | Dimer Acid 10.0 Stearylamine 8.0 | 1.2 | 0.5 | none |
| Example 3A | Oleic Acid | Oleic Acid 2.2 | Dimer Acid 3.0 Dilauryl- amine 4.0 | 2.0 | 0.2 | none |
| Comparative Example 3A | Oleic Acid | Oleic Acid 2.2 | Dimer Acid 7.0 | 1.0 | 0.3 | observed |

NOTE:
*A — Addition in grinding
*B — Addition after grinding
*C — Composition before mixing
*D — Composition after mixing
*E — ⦿most excellent
    ○excellent more than the standard
    X standard
*F — ml in a normal temperature and pressure

TABLE 2

| Example | Grinding Agent | Composition (parts by weight) *A | *B | Test 1B Hiding Power *C/*D | Test 2B Colour Purity *E | L-value | Film Strength | Gas Evolution | ΔL-Value |
|---|---|---|---|---|---|---|---|---|---|
| Example 1B | Dimer Acid | Dimer Acid 1.5 | Dilaurylamine 2.0 Emalgen 913 6.0 Emalgen 408 3.0 | 9400/9400 | ⦿ | 66 | ○ | none | 0.2 |
| Comparative Example 1B | Oleic Acid | Oleic Acid 1.3 | Dilaurylamine 2.0 Emalgen 913 6.0 Emalgen 408 3.0 | 9300/9300 | ⊗ | 64 | ○ | Gradually Evolution | 3.0 |
| Example 2B | Oleic Acid | Oleic Acid 1.3 | Dimer Acid 5.0 Stearylamine 4.0 Solvon T-85 15.0 | 9300/8200 | ○ | 65 | ○ | none | 0.3 |
| Example 3B | Oleic Acid | Oleic Acid 1.3 | Dimer Acid 4.0 Stearylamine 6.0 Tritox X-100 7.0 | 9300/8000 | ⦿ | 66 | ○ | none | 0.3 |

| Example | Grinding Agent | Composition (parts by weight) *A | *B | Test 3B Gas Evolution *F | ΔL-Value | Test 4B Agglomer- ation |
|---|---|---|---|---|---|---|
| Example 1B | Dimer Acid | Dimer Acid 1.5 | Dilaurylamine 2.0 Emalgen 913 6.0 Emalgen 408 3.0 | 1.5 | 0.3 | none |
| Comparative Example 1B | Oleic Acid | Oleic Acid 1.3 | Dilaurylamine 2.0 Emalgen 913 6.0 | >100 | Opaque (unable to measure) | none |

TABLE 2-continued

| | | | Emalgen 408 3.0 | | | |
|---|---|---|---|---|---|---|
| Example 2B | Oleic Acid | Oleic Acid 1.3 | Dimer Acid 5.0 Stearylamine 4.0 Solvon T-85 15.0 | 1.0 | 0.5 | none |
| Example 3B | Oleic Acid | Oleic Acid 1.3 | Dimer Acid 4.0 Stearylamine 6.0 Tritox X-100 7.0 | 1.2 | 0.4 | none |

NOTE:
*A — Addition in grinding
*B — Addition after grinding
*C — Composition before mixing
*D — Composition after mixing
*E — ◉ most excellent
  ○ excellent more than the standard
  X standard
*F — ml in a normal temperature and pressure

What is claimed is:

1. An aluminum flake pigment composition for paint, consisting essentially of 100 parts by weight of aluminum flake particles, 1 to 7 parts by weight of dimer acid as an agent for enhancing the colour purity, metallic luster and anticorrosion property of the paint containing the same aluminum flake pigment composition, and 0.5 to 14 parts by weight of an aliphatic amine as an agent for preventing the agglomeration of aluminum flake particles in the same composition.

2. The composition of claim 1, in which said dimer acid is derived from oleic acid or linoleic acid.

3. The composition of claim 1, in which said amine is selected from the group consisting of caprylamine, decylamine, laurylamine, myristylamine, palmitylamine, stearylamine, oleylamine, distearylamine and dilaurylamine.

4. An aluminum flake pigment composition for paint of water dispersible type, consisting essentially of 100 parts by weight of aluminum flake particles, 1 to 7 parts by weight of dimer acid as an agent for enhancing the colour purity, metallic luster and anticorrosion property of the paint containing the same aluminum flake pigment composition, 0.5 to 14 parts by weight of aliphatic amine as an agent for preventing the agglomeration of aluminum flake particles in the same composition, and 3 to 17 parts by weight of surface active agent for rendering the same composition water dispersible.

5. The composition of claim 4, in which said dimer acid is derived from oleic acid or linoleic acid.

6. The composition of claim 4, in which said amine is selected from the group consisting of caprylamine, decylamine, laurylamine, myristylamine, palmitylamine, stearylamine, oleylamine, distearylamine and dilaurylamine.

7. The composition of claim 4, in which said surface active agent is selected from the group consisting of fatty acid soaps, long-chained alcohol sulfate, polyoxyethylene alkylether sulfate, polyoxyethylene alkylphenylether sulfate, poplyoxyethylene isooctylphenylether sulfonate, sodium alkylbenzene sulfonate, polyoxyethylene alkylphenolether phosphate, polyoxyethylene alkylether phosphate, polyoxyethlene alkylether, polyoxyethylene alkylphenolether, polyoxyethylene alkylamide, polyoxyethlene fatty acid ester, polyoxyethylene sorbitan fatty acid ester and sorbitan fatty acid ester.

* * * * *

UNITED STATES PATENT AND TRADEMARK OFFICE
CERTIFICATE OF CORRECTION

PATENT NO. : 4,484,951

DATED : Nov. 27, 1984

INVENTOR(S) : Uchimura et al.

It is certified that error appears in the above-identified patent and that said Letters Patent is hereby corrected as shown below:

Cover sheet at [73] Assignee: change "Aluminum" to --Aluminium--.

Signed and Sealed this

Seventh Day of January 1986

[SEAL]

Attest:

DONALD J. QUIGG

Attesting Officer

Commissioner of Patents and Trademarks